United States Patent
Hefter et al.

(10) Patent No.: US 7,155,204 B1
(45) Date of Patent: Dec. 26, 2006

(54) SYSTEM AND METHOD FOR BILLING CALLS OVER A WIRELESS NETWORK

(75) Inventors: Jesse Hefter, Brookline, MA (US); Boris S. Elman, Newton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 742 days.

(21) Appl. No.: 10/007,960

(22) Filed: Nov. 13, 2001

(51) Int. Cl.
*H04M 11/00* (2006.01)

(52) U.S. Cl. .................. 455/406; 455/408; 379/114.24

(58) Field of Classification Search ................ 455/405, 455/406, 407, 408; 379/115.01, 121.01, 379/121.02, 126, 127.01, 127.03, 121.04, 379/114.1, 127.05, 127.06, 114.24

See application file for complete search history.

(56) References Cited

U.S. PATENT DOCUMENTS

| | | | |
|---|---|---|---|
| 5,557,664 A * | 9/1996 | Burns et al. ........... 379/127.05 |
| 5,579,379 A | 11/1996 | D'Amico et al. |
| 5,666,405 A * | 9/1997 | Weber .................. 379/127.03 |
| 5,822,411 A * | 10/1998 | Swale et al. ........... 379/114.22 |
| 5,850,599 A * | 12/1998 | Seiderman ................ 455/406 |
| 6,023,606 A | 2/2000 | Monte et al. |
| 6,138,006 A * | 10/2000 | Foti ........................ 455/414.1 |
| 6,167,124 A | 12/2000 | Johnson et al. |
| 6,169,891 B1 * | 1/2001 | Gorham et al. ............. 455/408 |
| 6,173,171 B1 | 1/2001 | Plush et al. |
| 6,181,785 B1 | 1/2001 | Adams et al. |
| 6,181,927 B1 * | 1/2001 | Welling et al. .......... 455/414.1 |
| 6,185,414 B1 | 2/2001 | Brunner et al. |
| 6,198,915 B1 | 3/2001 | McGregor et al. |
| 6,226,366 B1 | 5/2001 | Bala et al. |
| 6,263,056 B1 * | 7/2001 | Gruchala et al. ...... 379/114.01 |
| 6,397,055 B1 * | 5/2002 | McHenry et al. ........... 455/408 |
| 6,535,596 B1 * | 3/2003 | Frey et al. ............. 379/201.01 |
| 6,546,238 B1 * | 4/2003 | Nightingale et al. ........ 455/406 |
| 6,639,977 B1 * | 10/2003 | Swope et al. ........... 379/114.21 |
| 2002/0147001 A1 * | 10/2002 | Newdelman et al. ....... 455/405 |
| 2003/0045268 A1 * | 3/2003 | Himmel et al. ............. 455/408 |
| 2004/0058667 A1 * | 3/2004 | Pienmaki et al. ........... 455/405 |

\* cited by examiner

*Primary Examiner*—Binh K. Tieu

(57) ABSTRACT

A system and method that enables subscribers to transfer the airtime charge for the sending/receiving wireless telephone station to a toll free call provider to/from whom a wireless toll-free telephone call is placed. A communication network in accordance with the present invention includes a plurality of portable wireless telephone stations; a plurality of wired telephone stations; a plurality of local exchange carriers (LECs); at least one mobile switching center (MSC) a mobile base antenna tower. Each MSC, LEC and IXC is adapted to operate a program that retrieves billing information associated with wireless airtime from a rating system and then compile the information in a billing statement for a toll free call provider.

10 Claims, 4 Drawing Sheets

SYSTEM AND METHOD FOR BILLING CALLS OVER A WIRELESS NETWORK

TECHNICAL FIELD

The present invention relates to the field of telecommunications, and more specifically to a technique for billing charges for a wireless connection used by wireless telephone stations to a dialed toll-free number.

BACKGROUND

Toll-free long distance calling (e.g., using 800 and 888 numbers) has grown in popularity over the last 10 years, and according to recent press reports, comprises as much as 25% of all domestic interstate voice traffic. Much of this growth can be attributed to the expanding uses to which toll-free numbers are applied (e.g., for calling cards, nationwide paging, telemarketing campaigns, customer service centers, etc.). The called party, instead of the caller, pays the charges associated with such calls to the telecommunication carrier whose network carried the call.

When a caller in the United States, for example, dials 800-NXX-XXXX or 888-NXX-XXX, the local exchange carrier's central office switch associated with that caller recognizes that the number dialed is a toll-free number. The switch sends a query to a remote centrally-administered database (e.g., the 800 database) to determine which interexchange carrier is the designated carrier for calls to this toll-free number. The 800 database responds to the switch by providing a carrier identifier for the designated interexchange carrier (e.g., the carrier with whom the 800 customer has an account relationship). The switch then routes the call to that carrier for completion. The interexchange carrier translates the dialed toll-free number into the specific NPA-NXX-XXXX destination associated with that toll-free number in a database maintained by the carrier.

In addition to the charges normally associated with telephone calls over a wired network, wireless telephone calls (i.e., calls placed to/from a wireless telephone station) have a component of the cost of the call known as the "airtime" charge for the receiving/sending wireless telephone station. The "airtime" charge is the cost for use of the wireless channel associated with the receiving/sending wireless telephone station. At present, the airtime charge is always billed to the account associated with the wireless telephone station receiving/sending the call, regardless of the character of the destination of the call (800 or 888 number). This is a major factor that deters people from freely accessing toll free numbers from their mobile telephones.

Accordingly, there is a need for a system and method that permits toll free call providers to optionally pay airtime costs associated with toll-free telephone calls placed from a wireless telephone station to a toll free number managed by the provider. There is also a need for a system and method that allows a user to determine whether a toll-free provider has agreed to pay the costs associated with a toll-free telephone call over a wireless network before agreeing to continue with the call.

SUMMARY OF THE INVENTION

System and methods consistent with the present invention satisfy the above-described need by enabling subscribers to transfer the airtime charge for a sending wireless telephone station to the toll free call provider to whom a wireless toll-free telephone call is placed. In one embodiment, the invention includes a plurality of portable wireless telephone stations; a plurality of wired telephone stations; a plurality of local exchange carriers (LECs); at least one mobile switching center (MSC), and a mobile base antenna tower. Each MSC, LEC and IXC is adapted to operate a program that retrieves billing information associated with wireless airtime from a rating system and then compile the information in a billing statement for a toll free call provider. In operation, when a wireless telephone user places a telephone call to a toll free call provider, the communication network in accordance with the present invention determines whether the toll-free provider has previously agreed to pay the airtime charges associated with the wireless telephone call. Once a determination is made, the system informs the user of the toll-free call provider's fee arrangement, and the user is given an option of completing the call in light of that arrangement. If the user agrees to complete the call, a connection is made. The system stores billing information associated with the wireless airtime charges and transfers the charges to the appropriate party. At regular intervals (e.g., monthly), a bill is transmitted to the user and toll free call provider. In another embodiment, a user is connected to the toll free telephone number regardless of the toll-free call provider's fee arrangement. In cases where the toll-free provider agrees to pay the airtime charges, they are billed accordingly. In all other cases, the user is billed for the charges.

It is understood that both the foregoing general description and the following detailed description are exemplary and explanatory and are intended to provide further explanation of the invention as claimed.

DETAILED DESCRIPTION

Figure 1:
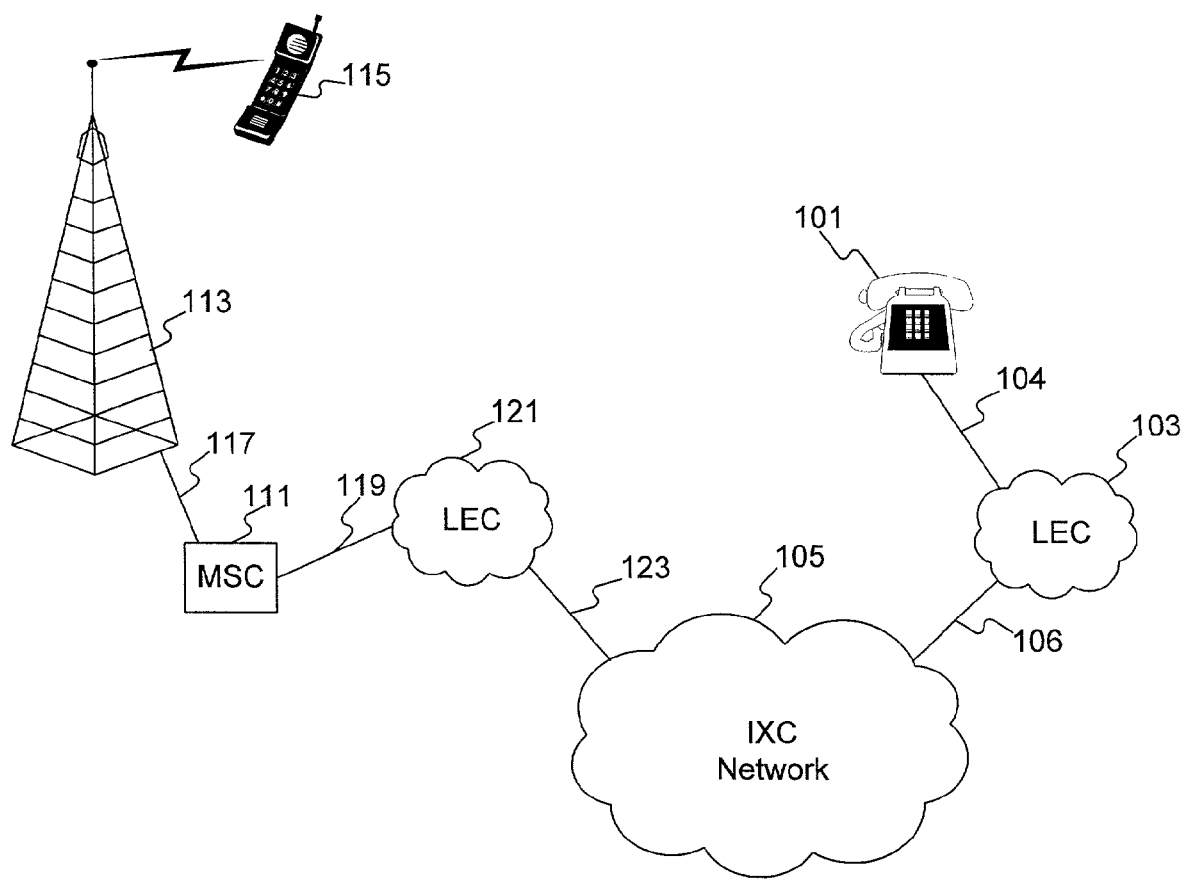
FIG. 1 is a network diagram of a communication network in which systems and methods consistent with the present invention may be implemented.

In the following detailed description reference is made to the accompanying drawings in which there is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limiting sense.

A communication network in accordance with principles of the present invention, includes a plurality of portable wireless telephone stations; a plurality of wired telephone stations; a plurality of local exchange carriers (LECs); at least one mobile switching center (MSC); and a mobile base antenna tower. Each MSC, LEC and IXC is adapted to operate a program that retrieves billing information associated with wireless airtime from a rating system and then compiles the information in a billing statement for a toll free call provider. In operation, when a wireless telephone user places a telephone call to a toll free provider, the communication network stores billing information associated with the wireless airtime. At regular intervals (e.g., monthly), a bill is transmitted to the toll free call provider.

Turning to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

Referring now to the drawings, in which like numerals represent like elements throughout the several figures, the present invention will be described.

FIG. 1 is an overview of a telecommunications system 10 that enables subscribers to transfer airtime charges for telephone calls placed at least partially over a wireless network to the toll free call provider to whom a wireless toll-free telephone call is directed, in accordance with the principles of the invention. System 10 of FIG. 1 includes a wired telephone station 101, local exchange carriers (LECs) 103 and 121, an interexchange carrier (IXC) network 105, a mobile switching center (MSC) 111, a mobile base antenna tower 113, and a wireless telephone station 115. As shown in FIG. 1, wired telephone station 101 is connected to LEC 103 via a telephone line 104. In FIG. 1, wired telephone station 101 is depicted as a handset, although other configurations may be used, including computers and interactive voice response units, etc. LEC 103 is in turn connected to IXC network 105 via a high capacity telephone line 106. Wireless telephone station 115 communicates on system 10 over a wireless interface with mobile base antenna tower 113. Tower 113 is connected to MSC 111 via telephone line 117. MSC 111 is connected to LEC 121 via a high capacity telephone line 119. LEC 121 is, in turn, connected to IXC network 105 through a high capacity telephone line 123. LECs 103 and 121 are shown as separate networks, but may be the same network. LEC 103 as shown in FIG. 1 is coupled to a single wired telephone station 101, and LEC 121 is coupled to a single MSC 111. LECs 103 and 121 may also be coupled to multiple wired telephone stations 101 and MSCs 111, respectively. LECs may additionally be coupled to a combination of wired telephone stations and MSCs without departing from the spirit and scope of the present invention.

Figure 2:
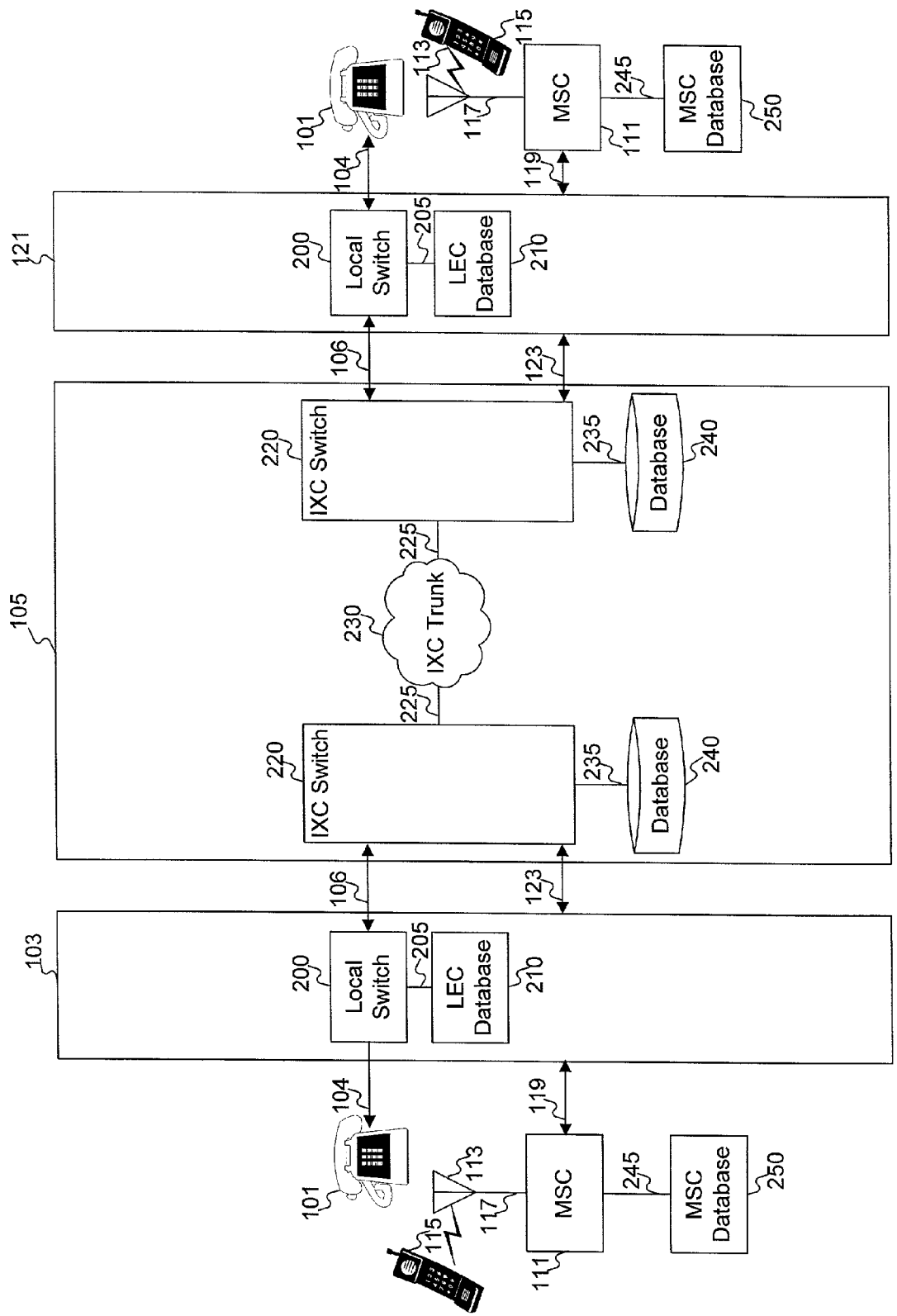
FIG. 2 is a detailed block diagram of the communication network of FIG. 1.

Referring now to FIG. 2, there is shown a more detailed representation of IXC network 105 in accordance with one embodiment of the present invention. IXC network 105, as shown in FIG. 2 is comprised of at least one IXC switch 220 and at least one IXC trunk 230. In operation, IXC network 105 is employed to establish connections from a first local exchange to a second local exchange via IXC switches and trunks. IXC switch 220 is linked to IXC trunk 230 along a high capacity interface 225 which allows IXC network 105 to route telephone calls from a source IXC switch to a destination IXC switch. IXC switch 220 is also coupled to IXC database 240 along bus interface 235. After directing a call to the proper destination, IXC switch 220 retrieves billing information generated by a rating system (not shown) from IXC database 240 over interface 235, and then records charges associated with a particular telephone call over interface 235 to IXC database 240 for storage and eventual retrieval by a customer billing system (not shown).

FIG. 2 additionally reveals that LECs 103 and 121 are comprised of at least one local switch 200. Local switch 200 communicates with IXC network 105 via IXC switch 220 over high capacity telephone line 106. As shown in FIG. 2, local switch 200 is also coupled to LEC database 210 along bus interface 205. In operation, local switch 200 is preprogrammed to recognize telephone numbers of wired telephone stations 101 served by local switch 200 and to properly route calls arriving at local switch 200. When local switch 200 receives a call, it accesses LEC database 210 to determine whether the call is directed to a wired telephone station 101 associated with local switch 200. If it is, the call is routed to the identified telephone station 101. If the call is not directed to a wired telephone station 101 associated with local switch 200, the call is routed to IXC network 105 via IXC switch 220, for final routing. Upon completion of the telephone call, LEC database 210 may store the charges associated with the call for eventual retrieval by a customer billing system (not shown). It is important to note that while the call may access an IXC switch 220, it is not necessary.

FIG. 2 also shows that MSC 111 communicates with IXC network 105 via LEC 103 over high capacity lines 119 and 123. MSC 111 is also coupled to MSC database 250 along bus interface 245. In operation, MSC 111 is preprogrammed to recognize the mobile identification numbers or telephone numbers of wireless telephone stations 115 served by MSC 111 and to properly route calls arriving at MSC 111. When MSC 111 receives a call, it accesses MSC database 250 to determine whether the call is directed to a wireless telephone station 115 associated with MSC 111. If it is, the call is routed to the wireless telephone station. If the call is not directed to a wireless telephone station 115 associated with MSC 111, the call is routed to LEC network (103, 121) and subsequently to IXC network 105 via IXC switch 220 for final routing. When MSC 111 routes a telephone call to one of its associated wireless telephone stations, the MSC retrieves billing information generated by a rating system (not shown) from MSC database 250 over bus interface 245. At the conclusion of the telephone call, MSC 111 may store the charges associated with the call for eventual retrieval by a customer billing system (not shown). MSC 111 may alternatively transmit charges associated with the telephone call over interface 235 to IXC database 240. The organization and location of local switch 200, MSC 111 and IXC switch 220 is shown here as an example of one embodiment of the present invention. They may be located in the same device or in a subset of the devices shown in FIG. 2 without departing from the spirit and scope of the present invention. LEC database 210, MSC database 250, and IXC database 240 may be similarly organized (consolidated or distributed).

Figure 3:
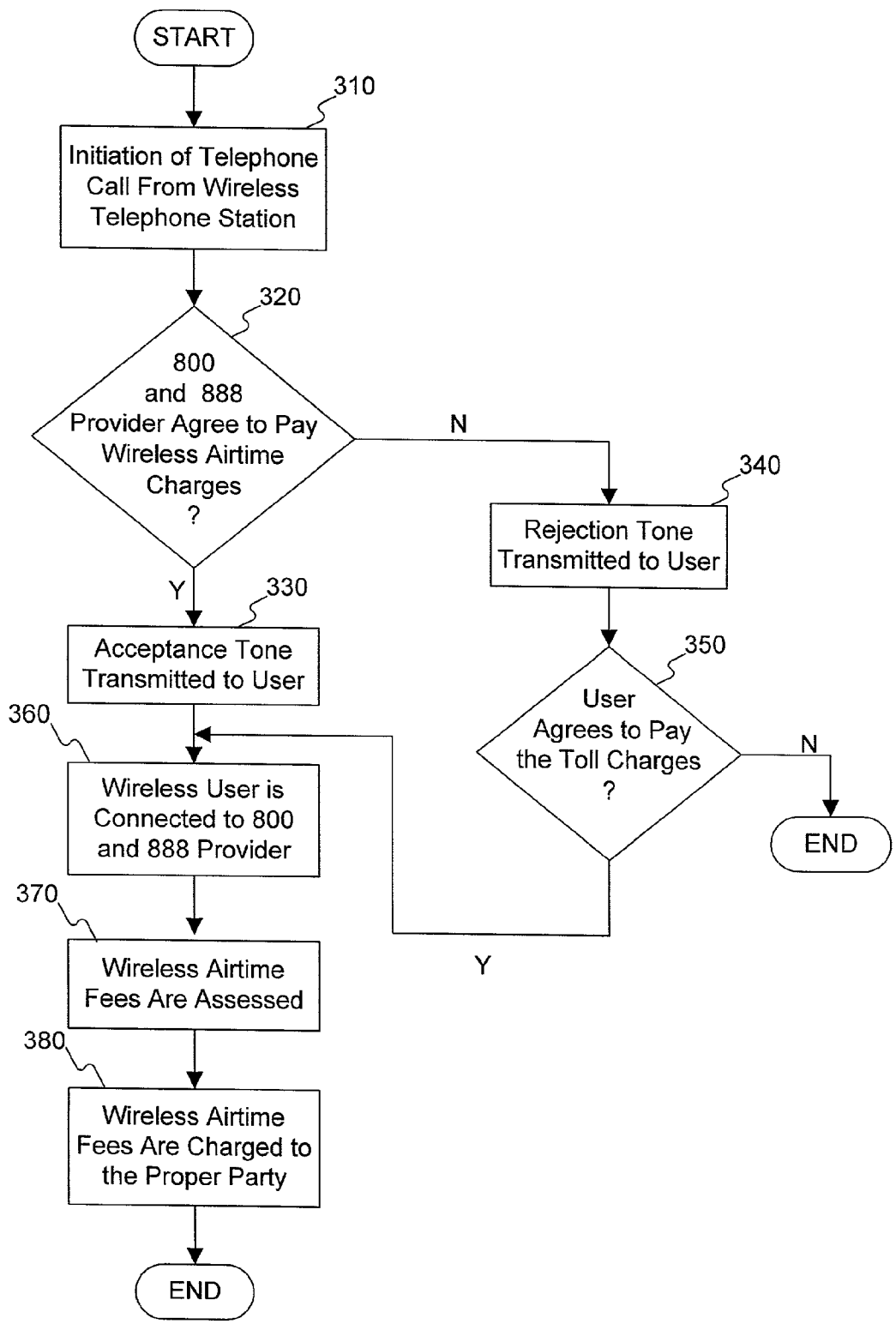
FIG. 3 is a detailed flow diagram of the process for billing charges associated with a wireless connection in accordance with one embodiment of the present invention.

Referring now to FIG. 3, a detailed flow diagram is shown that describes the process for billing charges associated with a wireless connection in accordance with one embodiment of the present invention. As shown in step 310, the process begins with the initiation of a telephone call from wireless telephone station 115. Processing for the call involves procedures used to connect a caller at a source telephone station to a destination telephone station. In one embodiment, the destination telephone station may be an 800 and 888 provider to whom a wireless toll-free telephone call is placed. Processing then flows to step 320 where it is determined whether the 800 and 888 provider has agreed to pay the charges associated with the wireless airtime. The indication that the toll-free provider agrees to pay the wireless charges may be accomplished by providing a dual-tone multi-frequency (DTMF) signal to the wireless user. Alternatively, the wireless user may be prompted through a voice prompt or data message to indicate whether the toll-free provider has previously agreed to pay for the wireless airtime charges. If the toll free provider has agreed to pay the wireless airtime charges, processing flows to step 330 and an acceptance message is transmitted to the user. Processing then flows to step 360. If the toll free provider does not agree to pay the wireless airtime charges, a rejection message is transmitted to the user in step 340. Processing then flows to step 350, where the user is given an opportunity to disconnect the telephone call. If the user declines to pay the airtime charges, processing terminates. On the other hand, if the user agrees to pay the wireless airtime charges, processing flows to step 360. In step 360, the wireless user is connected to the toll-free provider. The process then detects a termination of the call and queries one or more databases (MSC, LEC and IXC) to determine the cost of the call (step 370). Processing then flows to step 380 where the process presents the post call charge information to the appropriate party in the form of a monthly or otherwise periodic bill. In a second embodiment, the user is not informed of the toll-free provider's fee arrangement before connecting the telephone call.

Figure 4:
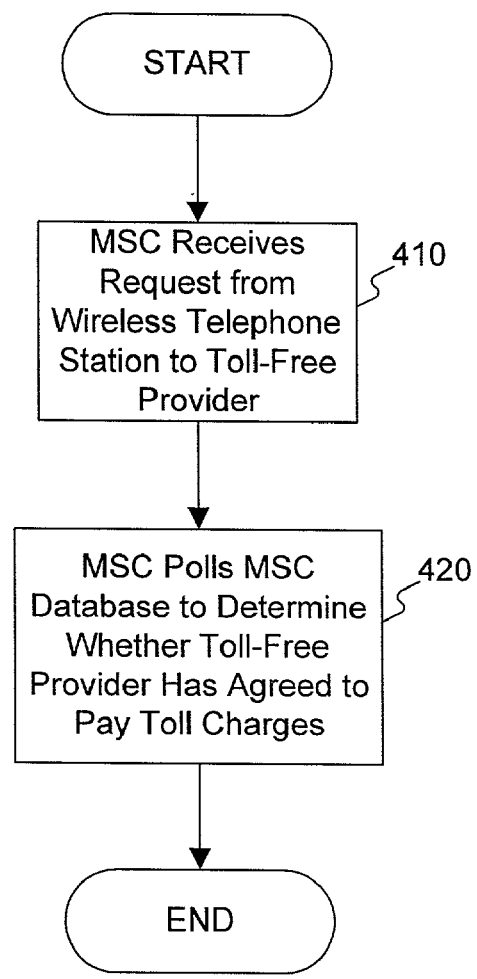
FIG. 4 is a detailed flow diagram of the process depicted in FIG. 3 for determining whether a toll-free provider agrees to pay airtime charges.

Referring now to FIG. 4, a detailed flow diagram is shown that describes the process performed in step 320 of FIG. 3. As shown in FIG. 4, the process begins when MSC 111 receives a request from wireless telephone station 115 to connect a user of wireless telephone station 115 to a toll-free provider (step 410). Processing then flows to step 420 where MSC 111 polls MSC database 250 to determine whether the destination toll-free provider has previously agreed to pay the charges associated with the wireless airtime connection. In one embodiment, MSC database 250 may store individual 800 and 888 numbers with an associated data bit indicating whether or not the 800 and 888 provider associated with the number has previously agreed to pay wireless airtime charges when calls are placed to the individual 800 and 888 number. MSC database 250 may alternatively store in a first logical location, individual 800 and 888 numbers with associated providers. In a second location, MSC database 250 may store a plurality of providers with an associated data bit indicating whether or not the provider agrees to pay wireless airtime charges when calls are placed to telephone numbers associated with the 800 and 888 provider. While this detailed description has indicated two embodiments of a data record in MSC database 250, it is understood that many different embodiments may be implemented without departing from the scope and spirit of this invention.

From the foregoing description, it will be appreciated that the present invention provides a system and method that enables subscribers to transfer the airtime charge for the sending wireless telephone station to the 800 and 888 provider to whom a wireless toll-free telephone call is placed. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; or other forms of RAM or ROM. Similarly, the method of the present invention may conveniently be implemented in program modules that are based upon the flowcharts in FIGS. 3–4. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for billing wireless telephone calls, comprising:
    collecting a dialed telephone number from a wireless telephone station;
    determining whether the telephone number is associated with a party who agrees to pay an airtime charge for a call from the wireless telephone station regardless of the wireless telephone station, thereby making an airtime charge payment responsibility determination without regard to the wireless telephone station, wherein the determining step further comprises:
        accessing a database comprised of a plurality of telephone numbers with associated data bits, said data bits indicating whether a provider associated with the telephone number agrees to pay an airtime charge for a call from a wireless telephone station; and
        identifying whether the telephone number is associated with a party who agrees to pay an airtime charge for a call from a wireless telephone station, provided said data bit is a predetermined value;
    informing a wireless user of the wireless telephone station of the determination; and
    connecting the wireless user to a telephone station associated with the dialed telephone number to obtain a connection.

2. The method of claim 1, further comprising:
    terminating the connection;
    computing the airtime charge for the connection; and
    billing the party.

3. The method of claim 1, wherein the connecting further comprises connecting the wireless user to a telephone station associated with the telephone number, provided the party agrees to pay for the airtime charge.

4. The method of claim 1, wherein the connecting further comprises connecting the wireless user to a telephone station associated with the telephone number, provided the wireless user agrees to pay for the airtime charge.

5. The method of claim 1, wherein the party is a toll-free provider.

6. A computer-readable medium containing instructions for billing wireless telephone calls, the instructions comprising:
    collecting a dialed telephone number from a wireless telephone station;
    determining whether the telephone number is associated with a party who agrees to pay an airtime charge for a call from the wireless telephone station regardless of the wireless telephone station, thereby making an airtime charge payment responsibility determination without regard to the wireless telephone station, wherein the determining step further comprises:
        accessing a database comprised of a plurality of telephone numbers with associated data bits, said data bits indicating whether a provider associated with the telephone number agrees to pay the airtime charge for a call from a wireless telephone station; and
        identifying whether the telephone number is associated with a party who agrees to pay the airtime charge for a call from a wireless telephone station, provided said data bit is a predetermined value;
    informing a wireless user of the wireless telephone station of the determination; and
    connecting the wireless user to a telephone station associated with the dialed telephone number.

7. The computer-readable medium of claim 6, wherein the party is a toll-free provider.

8. The computer-readable medium of claim 6, wherein the instructions further comprise:
    terminating the connection;
    computing the airtime charge for the connection; and
    billing the party.

9. The computer-readable medium of claim 6, wherein the instructions for connecting further comprise instructions for connecting the wireless user to a telephone station associated with the telephone number, provided the party agrees to pay for the airtime charge.

10. The computer-readable medium of claim 6, wherein the instructions for connecting further comprise instructions for connecting the wireless user to a telephone station associated with the telephone number, provided the wireless user agrees to pay for the airtime charge.

* * * * *